United States Patent [19]
Barrus

[11] Patent Number: 5,914,783
[45] Date of Patent: Jun. 22, 1999

[54] METHOD AND APPARATUS FOR DETECTING THE LOCATION OF A LIGHT SOURCE

[75] Inventor: John Barrus, Menlo Park, Calif.

[73] Assignee: Mistubishi Electric Information Technology Center America, Inc., Cambridge, Mass.

[21] Appl. No.: 08/823,513

[22] Filed: Mar. 24, 1997

[51] Int. Cl.⁶ .............................. G09G 5/08; G01B 11/14
[52] U.S. Cl. .......................... 356/375; 345/157; 345/179
[58] Field of Search ..................................... 346/157, 179; 356/375

[56] References Cited

U.S. PATENT DOCUMENTS

| | | | |
|---|---|---|---|
| 5,138,304 | 8/1992 | Bronson | 345/157 |
| 5,394,183 | 2/1995 | Hyslop | 345/157 |
| 5,502,459 | 3/1996 | Marshall et al. | 345/157 |
| 5,502,514 | 3/1996 | Vogeley et al. | 345/179 |
| 5,502,568 | 3/1996 | Ogawa et al. | 356/375 |
| 5,515,079 | 5/1996 | Hauck | 345/157 |
| 5,654,741 | 8/1997 | Sampsell et al. | 345/157 |

Primary Examiner—Frank G. Font
Assistant Examiner—Zandra V. Smith
Attorney, Agent, or Firm—Dirk Brinkman

[57] ABSTRACT

In an audio/visual computer-generated presentation system in which material is presented to an audience through projection of the material to a screen, the position of a remotely-generated spot from a laser illuminator is detected by a so-called sensor which is positioned to detect light from the spot which is diffusely reflected off the screen along the portion of the optical path between the computer-driven light modulator and the screen, with the sensing of the position of the spot at the time of the generation of a selection signal being used to change the on-screen material. The on-axis sensor for detecting the light spot eliminates speed and accuracy problems associated with off-axis CCD camera detection, while at the same time providing a presenter with a robust method of selecting computer-generated material to be presented.

5 Claims, 5 Drawing Sheets

METHOD AND APPARATUS FOR
DETECTING THE LOCATION OF A LIGHT
SOURCE

FIELD OF THE INVENTION

This invention relates to detecting the location of a light source, such as might be used as a pointing device, and more particularly to the detection of the position of a laser pointer beam on a screen for the control of computer-generated images.

BACKGROUND OF THE INVENTION

Audio/visual presentations often employ light projection systems which allow modulation of a light source and projection of the modulated light source onto a screen. In a typical prior art projection system, a light source provides light along an optical path to a light modulator where the light is modulated in accordance with the computer-generated presentation and continues along the optical path where it is projected onto a screen.

One implementation of a prior art light projection system is achieved by utilizing a digital micromirror from Texas Instruments Incorporated, like the Lite Pro 620 projector from InFocus Systems, Inc. of Wilsonville, Oreg. The digital micromirror is an array of individual mirrors controlled by a computer to modulate light from a light source, with each mirror controlling an on-screen pixel. In one embodiment, the pixel is turned ON or OFF depending on the orientation of the corresponding mirror. An ON condition occurs when the light from the source is directed onto the screen, with an OFF condition being when the light is directed away from the screen.

Once having generated on-screen material, it is useful to utilize a pointing device to select particular areas, and even pixels, on the screen. One prior art pointing device is available as the Cyclops laser pointer. While laser pointers have been available for many years to designate or call attention to on-screen material, it is oftentimes useful to change the on-screen material by selecting a particular on-screen icon or other indicia and by so doing cause the computer to change the displayed information. Thus, when using a computer driven display, it is oftentimes desirable to provide a cursor on the display and to click on a portion of the display as if by using a mouse so as to have the computer change the presentation to the selected material. As a result, it is desirable to have a device which can both illuminate a selected portion of the screen to highlight some text or select an icon and have the computer-generated display respond to this selection with the presentation of new material.

SUMMARY OF THE INVENTION

In accordance with the teachings of the present invention, in one embodiment a light projection system is provided which includes a light source for imaging a screen, and a light modulator having an array of mirrors optically coupled between the source and the screen along a single optical path to provide for a presentation. A separate laser pointer is used to illuminate the screen at a point, with light from the illuminated point on the screen travelling back along a portion of the light path from the source.

Rather than being reflected back to the source, light from each on-screen pixel is reflected to a detector during a scanning procedure in which each of the pixel mirrors is sequentially switched to reflect light from a corresponding on-screen pixel to a detector in an order which permits identifying the on-screen pixel illuminated by the spot of laser light. The subject system thus senses the existence of an illuminated spot and its location on the presented material. If the illuminated material is to be selected, in one embodiment, a switch on the laser pointer is depressed which signals that a selection has been made by means of an RF link. The selection signal is correlated with the detection of the location of the illuminated on-screen pixel to instruct the computer to change the display accordingly.

As such, the subject system both projects computer-generated presentations onto a screen and detects selections made by a laser pointer which provides an illuminated cursor in the form of a dot on the screen. The detection of light from the dot specifies where the cursor exists and upon activation, selects the next material to be presented.

In general, the subject system comprises a light source and a modulator for providing on-screen pixels of information, each with a different on-screen location. A laser pointer is used to illuminate selected on-screen material by illuminating an on-screen pixel. Light from this pixel is detected along a portion of the optical path between the light source and the screen, with this returned light being detected either by the aforementioned light modulator, by a photo-diode arrangement or like device. These devices serve to detect the location of the laser illumination spot on the screen, with a separate selection mechanism used to select the illuminated on-screen icon or material detected.

In summary, in an audio/visual computer-generated presentation system in which material is presented to an audience through projection of the material to a screen, the position of a remotely-generated spot from a laser illuminator is detected by a so-called sensor which is positioned to detect light from the spot which is diffusely reflected off the screen along the portion of the optical path between the computer-driven light modulator and the screen, with the sensing of the position of the spot at the time of the generation of a selection signal being used to change the on-screen material. The on-axis sensor for detecting the light spot eliminates speed and accuracy problems associated with off-axis CCD camera detection, while at the same time providing a presenter with a robust method of selecting computer-generated material to be presented.

BRIEF DESCRIPTION OF THE DRAWINGS

These and other features of the Subject Invention will be better understood taken in conjunction with the Detailed Description in conjunction with the drawings of which.

DETAILED DESCRIPTION

Figure 1:
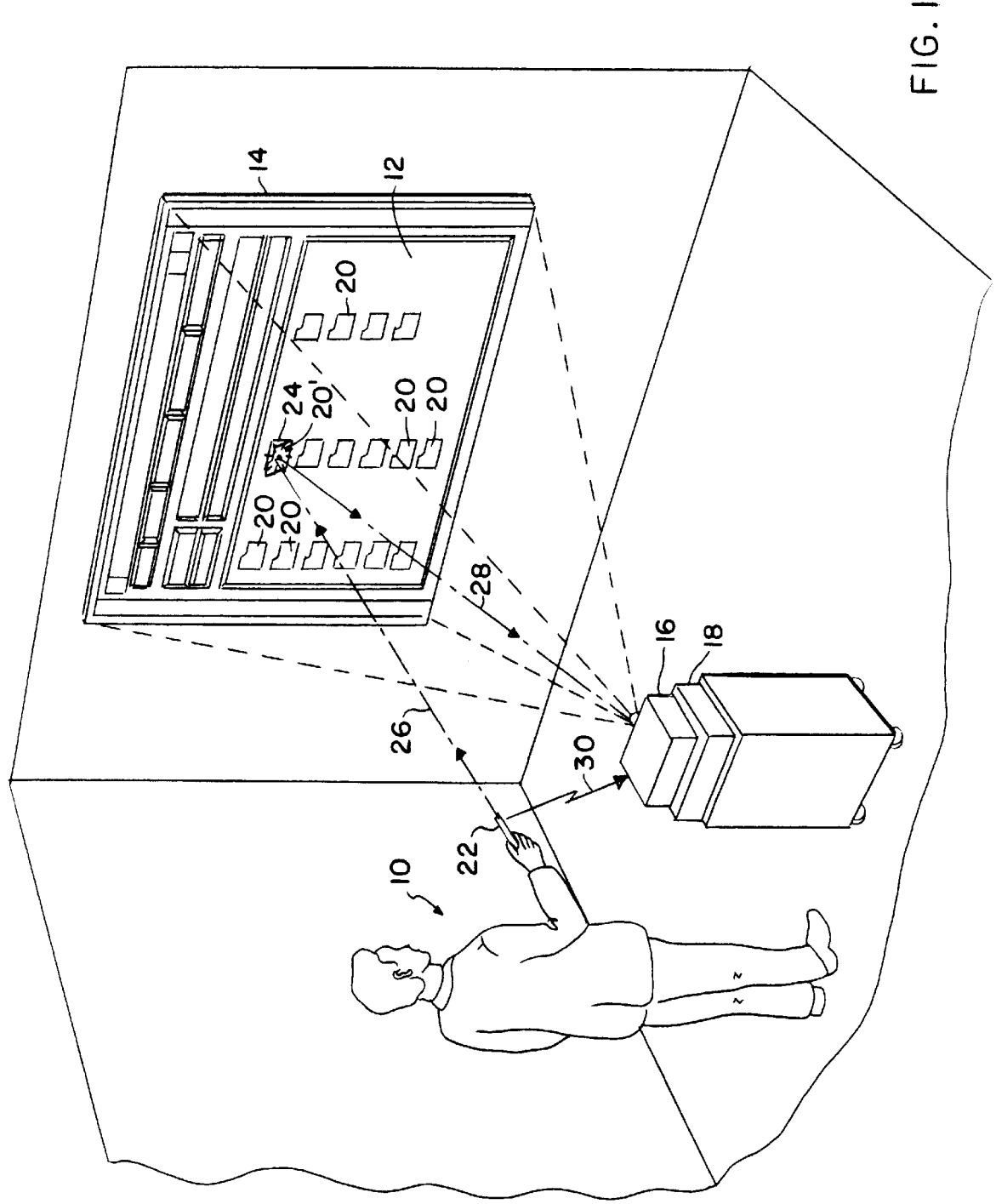
FIG. 1 is a diagrammatic illustration of a computer-generated presentation, with the use of a laser illuminator to both illuminate the on-screen icon and to select the icon so that the computer-generated presentation can be changed.

Referring now to FIG. 1, an individual 10 is shown viewing a presentation 12 on a screen 14, with presentation 12 being projected via a projector 16 having an internal light modulator coupled to a controller that is in turn coupled to a computer 18 so as to provide a computer-driven presentation. It can be seen that the presentation contains a number of on-screen icons 20, which in the illustrated case resemble file folders.

Individual 10 utilizes a laser light pointer 22 which may be one of a number of laser light pens, which provides a point of light 24 on an icon 20'. The laser beam is shown at 26 as being directed to icon 20', with light diffusely reflected from the screen at point 24 being imaged in the reverse direction onto the modulator used to produce the presentation by the same optics that projects the modulator light on the screen. As a result, a portion of the diffusely reflected light is directed back towards projector 16 on light path 28 which is the portion of the light path which exists between the modulator within projector 16 and screen 14.

As will be described in connection with FIGS. 3–6, an on-axis sensor detects the position of light spot 24 on screen 12, with the detection of the location of the spot along with a selection signal illustrated by arrow 30 being provided to computer 18, causing the presentation 12 on display 14 to change. In this way, an individual 10 giving a talk to an audience using a computer-generated presentation has the ability to select an on-screen icon or portion of the text. Once selected, the presentation is changed in accordance with the selected icon. The operation of the laser illumination device, along with the selection signal generation, is similar in operation to the mouse click selection process in which a cursor is moved about a screen by a mouse and in which the particular icon or text is selected through a mouse click.

Figure 2:
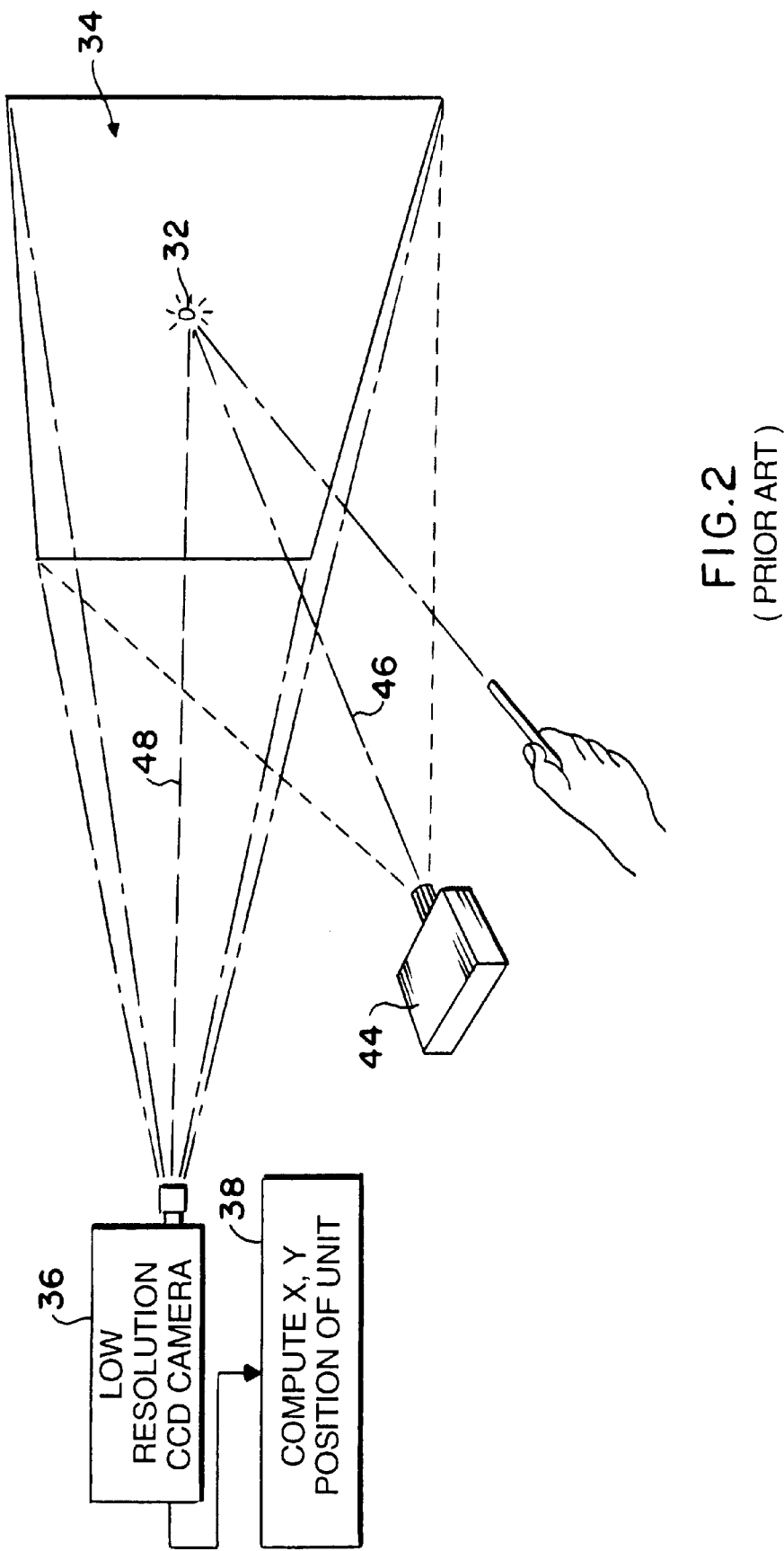
FIG. 2 is a diagrammatic illustration of a prior art laser illumination system, illustrating off-axis detection at a low resolution.

Referring now to FIG. 2, in the past, the position of a laser illuminated spot 32 on a screen 34 is detected by a CCD camera generally indicated at 36, with the location of spot 32 on screen 34 computed in accordance with the output of the CCD array by a computational unit 38. The output of the computational unit is the XY position of the illuminated spot. Note that the computer-driven display includes projector 44 which projects the presentation along an optical axis 46. Note also that the optical axis 48 for CCD camera 36 is at an angle to axis 46, making the spot detection off-axis. However, because of the utilization of an off-axis device for detecting the spot, this prior art system suffers from low accuracy, and the requirement of a set up procedure for aligning the camera with the projector which is both inconvenient and involves separately packaged apparatus. The pixels of the CCD do not correspond precisely with the pixels of the projector due to differences in resolution and alignment. Therefore, individual pixels cannot be precisely selected using the system shown in FIG. 2.

Since the CCD camera is a low resolution device as illustrated at 42, this prior art system suffers from positional accuracy problems, such that the location of the illuminated spot on screen 34 cannot be ascertained with a great degree of certainty. This is the case with the Cyclops 2050 interactive pointer system manufactured by the Proxima Corporation of San Diego, Calif.

Figure 3:
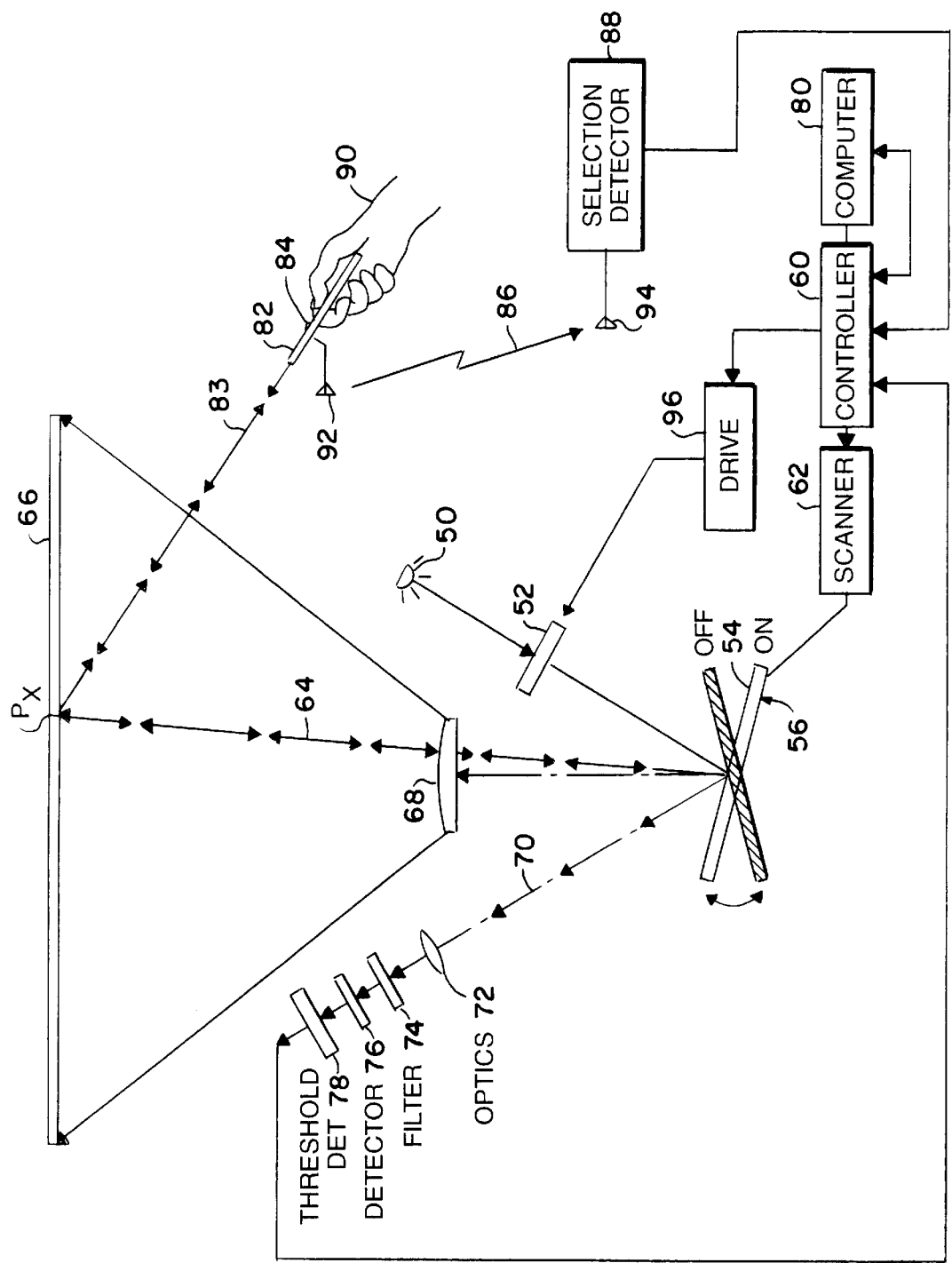
FIG. 3 is a schematic and block diagram of one embodiment of the Subject Invention illustrating on-axis detection of the location of a laser spot using an array of mirrors whose pointing direction is computer-controlled in conjunction with the generation of a selection signal.
Figure 4:
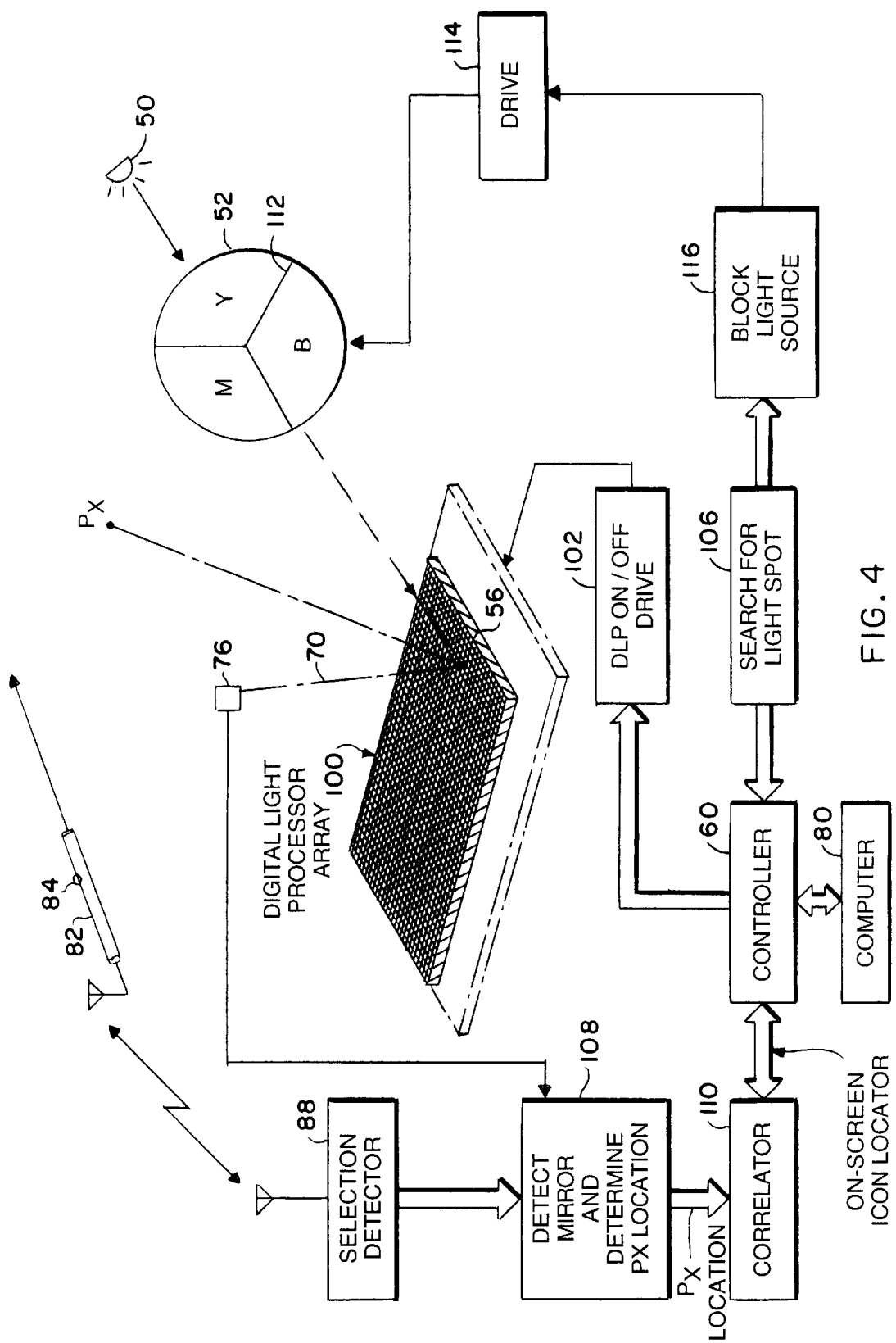
FIG. 4 is a diagrammatic illustration of the system of FIG. 3 showing an expanded block diagram and a representation of the mirror array forming a digital light processor for the modulation of light from a light source.

Referring now to FIGS. 3 and 4, in one embodiment, a light modulator, in the form of a Texas Instrument digital light processor, utilizes an array of mirrors to modulate light from a light source 50 projected through a color wheel 52 onto the surface 54 of one or thousands of movable mirrors 56 that are part of the array. Mirror 56 is pivoted from an ON position to an OFF position under the control of a controller 60 through a scanning unit 62. In general, when mirror 56 is in the ON position as illustrated, light from source 50 through color wheel 52 is reflected along a path 64 towards a screen 66 where it impinges upon the screen at a pixel $P_x$ as illustrated. Light from mirror 66 is, of course, first focused through an optical system generally illustrated at 68 so that for each individual on-screen pixel 66, a given mirror in the array is responsible for either light reaching it from source 50 or being directed away from the screen, thereby leaving the screen pixel blank.

Assuming that mirror 56 has only two positions as illustrated, when the mirror is in the OFF position, any light coming back along path 64 is reflected along path 70 through optics 72, and a filter 74 to a detector 76. If pixel $P_x$ is illuminated, this fact is registered as an output of the detector.

Assuming the illumination is above a threshold established by threshold detector 78, this fact is communicated to controller 60 which knowing that the particular mirror involved in reflecting $P_x$ establishes the XY location of pixel $P_x$ on screen 66.

Thus, in the scanning sequence, at any time, $T_o$, when mirror 56 is switched from an ON to an OFF condition, an output from threshold detector 78 indicates the presence of a highly illuminated spot at pixel $P_x$.

As illustrated, this spot can be generated through the utilization of a laser pointer wand 82, which projects its light along path 83 to pixel $P_x$. If it is desired to select the icon which has been projected onto screen 66 at pixel $P_x$, then a button 84 on wand 82 may be depressed to send an RF signal 86 to a selection detector 88 which records the preference of the user 90 that pixel $P_x$ be selected. As illustrated, this may be an RF link between antennas 92 and 94 or, optionally, may be an IR link, a hard wired electrical link or a mechanical link if such is desired.

Of importance is that at any given time in the scanning schedule, a single mirror is in the OFF position. If there is an output from detector 78 at this time, this indicates the existence of an illuminated spot at the corresponding on-screen pixel.

For color presentations, it will of course be appreciated that color wheel 52 may be driven as by drive 96 under the control of controller 60, such that the color of pixel $P_x$ may be determined by the color segment of the wheel in the light path from the source when mirror 56 is in the ON position.

Note that there are two computers involved in any projection system. One computer generates the values for the pixels which are shown on the display. The output which usually goes to the monitor is redirected to the projection system. Inside the projector, the other computer, called a "controller", runs the display and makes sure that the values sent by the computer are displayed properly on the screen. This controller manages the little mirrors and turns them on and off at the right time. Thus, there are two processors or CPU's involved in the projection system. One takes mouse input and outputs the visual information to the projector. The other CPU is inside the projection system and figures out where the light point is on the screen and relays that back to the computer via the mouse port or some other bus such as a serial port, parallel port, IEEE 1394 port, Ethernet, ISA bus, etc.

Referring now to FIG. 4, digital light processor array 100 is shown including mirror 56 of FIG. 3. Also shown is light source 50, color wheel 52, wand 82 and selection detector 88. It will be appreciated that controller 60 is utilized to drive array 100 through a digital light processor drive 102 which is a generalized drive unit capable of the scanning function performed by scanner 62 in FIG. 3.

For generating on-screen images, controller 60 activates drive 102 to appropriately switch mirrors to the ON or OFF position depending on the program material, with color wheel 52 determining whether red, green or blue light is to be reflected to pixel $P_x$.

Likewise, in the scan mode, when it is necessary to determine the location of an illuminated pixel, then controller 60 under control of a search algorithm 106 causes each of the mirrors in array 100 to change from an ON condition to an OFF condition. If pixel $P_x$ is illuminated, light will be projected along path 70 to detector 76, a fact recorded by a unit 108 which is used to identify the mirror having an output when selector button 84 is pushed.

Having identified the mirror responsible for pixel $P_x$, the XY position of the illumination is automatically established. This X,Y location is correlated at 110 with the underlying on-screen icon, such that computer 80, upon being notified by controller 60 of the X,Y location of the pixel $P_x$, is caused to generate the appropriate change in the display, with the icon having been selected by the laser pointer and the pushing of button 84.

It will be appreciated that light may be blocked from source 50 during a scan sequence through the utilization of a black line 112 on color wheel 52. During the searching sequence, color wheel 52 is controlled to place black line 112 on the optical path between the source and the modulator in accordance with an algorithm denoted by block 114, so that the pixel search scan is not visible as a dynamic pattern on the screen.

Figure 5:
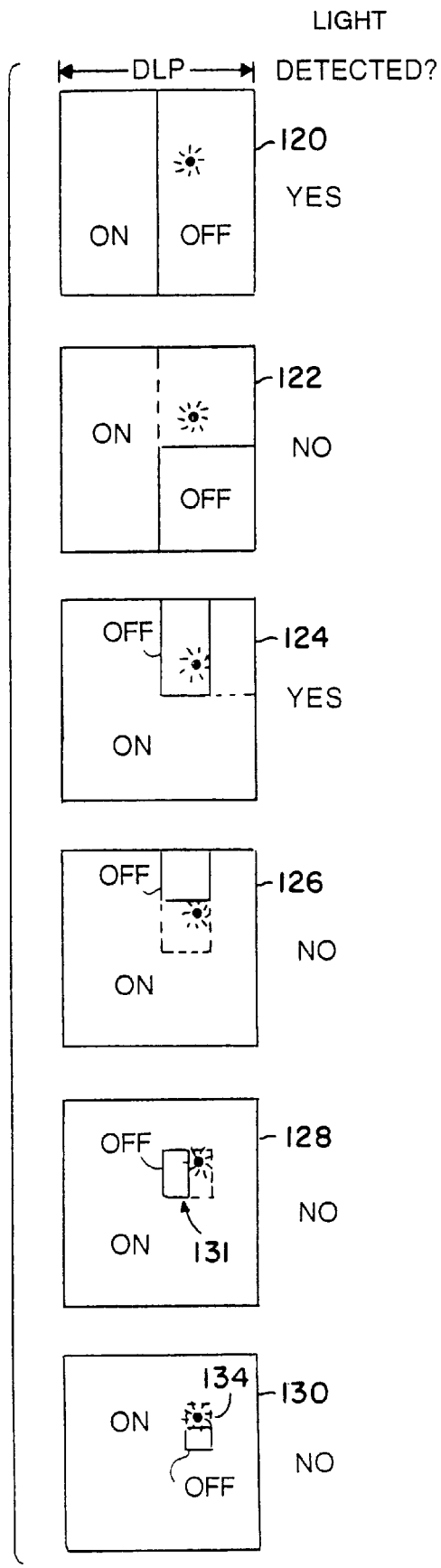
FIG. 5 is a diagrammatic illustration of a mirror scanning sequence for use in ascertaining which mirror of the array of FIG. 4 is reflecting light from an illuminated spot on the screen.

Referring now to FIG. 5, it is of course possible in the scan mode to sequentially flip each of the mirrors in the array. However, this is a time consuming cumbersome process. In order to speed up the search, the scanning can be divided up into a quick scan technique in which the mirrors are divided first into halves and then into quarters, and then further subdivided depending on whether or not laser light has been detected.

For instance, as illustrated at box 120, the left hand mirror elements are turned ON, whereas the right hand elements are turned OFF. As will be appreciated, since there is a light spot received by at least one of the mirrors in the right hand portion, the output of such a scan would indicate that further processing is required for the right hand side of the array. As illustrated at box 122, the lower right hand quadrant of mirrors is turned OFF. However, there is no laser light detected indicating that this lower right hand portion of the array does not contain mirrors which would indicate the location of the laser illumination spot.

Referring now to box 124, the upper right hand quadrant is then selected and again subdivided with the left hand portion of the mirrors in this portion being turned OFF. Here it can be seen that laser light is detected which means that one of the mirrors in this portion is that which indicates the position of the laser spot.

Referring now to box 126, again dividing this further portion into two and turning OFF the upper portion results in no laser light being detected, whereas as illustrated by box 128, again subdividing vertically as illustrated, indicates no laser light detected when the left hand mirrors within this portion are turned off.

Finally, as illustrated at 130, taking the right hand partition of portion 131 and turning OFF the bottom portion, the result of no laser light detected indicates that the mirror responsible for detecting reflected light is in fact in the box illustrated by 134.

In this partitioning routine, it is possible to ascertain which of the mirrors is that which is reflecting the laser light orders of magnitude faster than a sequential scanning of all the mirrors in the digital light processor.

The speed and accuracy with which the position of the illuminated spot on the screen can be detected, is on the order of 200 microseconds, with a positional accuracy of a single pixel.

What makes the determination of the XY position of spot $P_x$ in FIG. 3 so speedy is that no correlation need be made between the optics associated with detecting the spot and those actually involved in generating the on-screen pixel. The reason is quite simply that the sensor is on the exact axis which defines the path of light after it has been processed by the light modulator on its way to the screen. The result is that there need be no time consuming correlation between the optical system of an off-axis sensor and the optical system utilized to project onto the screen.

An additional advantage of this system is that only a low cost sensor and set of optics need be added to existing projectors, where the CCD solution used by other systems is much more expensive.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In an audio/visual computer-generated presentation system in which material is presented to an audience through the projection of the material to a screen by modulation of light from a light source using a modulator interposed in the light path between said light source and said screen, with a portion of said path being that portion between said modulator and said screen, apparatus for changing on-screen material comprising;

user directable means for projecting a highly defined point of light on said screen at a position determined by said user;

means for detecting the position of said point of light on said screen including a sensor for detecting light diffusely reflected from said screen along said portion of said light path;

a wireless transmitter collocated with said projecting means for generating a signal other than the light itself, said signal representing a wireless transmitted signal;

a selection detector for generating a selector signal responsive to the receipt of said wireless transmitted signal; and, means responsive to both the detected position of said point of light and said selection signal for changing the material projected onto said screen.

2. The apparatus of claim 1, wherein said modulator reflects light from said light source to said screen and wherein said sensor detects light reflected by said modulator.

3. The apparatus of claim 1, wherein said material includes an icon, the selection of which causes a change in said material, and further including means for generating a selection signal and means responsive to said selection signal and said position of said point of light illuminating said on-screen icon for detecting the coincidence of the position of said point of light with said icon and for changing said material projected on screen.

4. The apparatus of claim 1, wherein said projecting means includes a laser.

5. The apparatus of claim 1, wherein said modulator includes an array of ON-OFF positionable mirrors, wherein said sensor includes a detector for receiving light from said mirrors when a mirror is in an OFF position and wherein said means for detecting the position of said point of light includes scanning means for switching each of said mirrors to its OFF position at a predetermined time, thereby to permit correlation of detector output with a particular mirror and thus a particular position of said point of light on said screen.

* * * * *